Dec. 20, 1927.

R. W. EVANS 1,653,351

WINDOW SCREEN

Filed May 22, 1926

Inventor
Richard W. Evans
By Herbert E. Smith
Attorney

Patented Dec. 20, 1927.

1,653,351

UNITED STATES PATENT OFFICE.

RICHARD WALTER EVANS, OF SPOKANE, WASHINGTON.

WINDOW SCREEN.

Application filed May 22, 1926. Serial No. 110,999.

My invention relates to improvements in window screens which while adapted for use with various types of windows, is especially applicable for use with windows of automotive vehicles such as closed passenger cars and busses, and with street railway cars as well as with passenger cars for railroads.

By the utilization of the improvements of my invention, physically embodied as hereinafter set forth, a screen of this type is provided which may readily be attached for use when required and which may with equal facility be detached from the window frame when not needed, without the requirement of skilled labor. Means are provided for retaining the screen in its proper position in such manner as to effectually prevent rattling and displacement of parts, and the screen is fashioned and secured in such manner as to enhance the appearance of an automobile equipped therewith. Because of the minimum number of its parts and simplicity of construction the screen may be manufactured in quantities and at a low cost of production, preferably of metal. When attached to a closed passenger automobile or bus the screen also performs the function of a wind or draft-shield, and means are provided whereby it may be lifted to a limited extent to provide an opening at the window sill for various purposes.

My invention consists in certain novel combinations and arrangements of parts as will hereinafter be more fully set forth and claimed.

In the accompanying drawings I have illustrated one complete example of the physical embodiment of my invention as applied to the window of a closed automobile, wherein the parts are combined and arranged according to the best mode I have thus far devised for the practical application of the principles of my invention, but it will be understood that the screen may be used with other types of windows, and that various changes and alterations may be made in the exemplified structure within the scope of my claims without departing from the principles of my invention.

Figure 1:
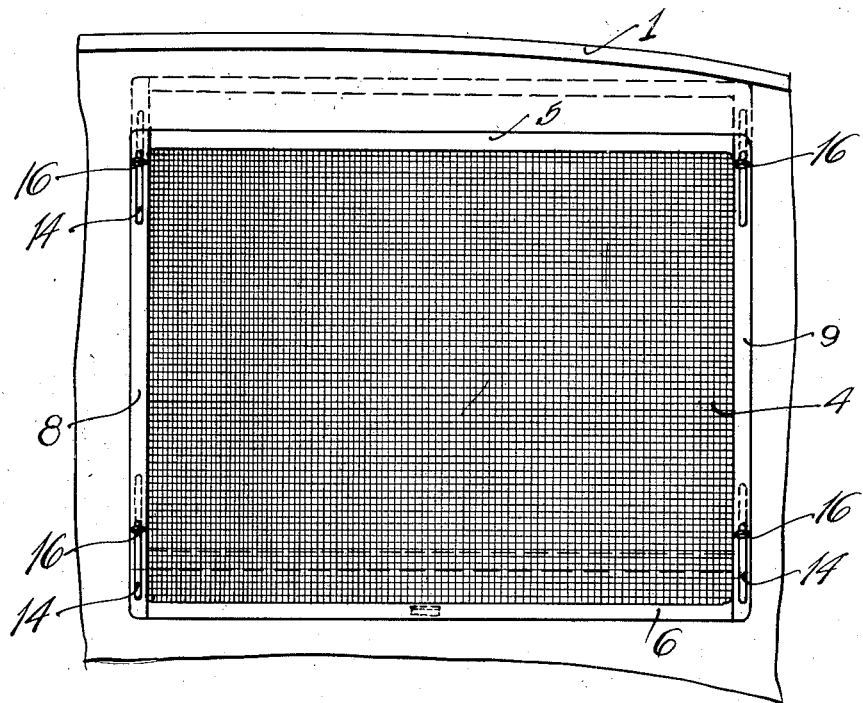
Figure 1 is a view in elevation showing one of the screens attached at the outer side of a window of a closed car, and indicating by dotted lines that the screen may be lifted to provide an opening at the window sill.
Figures 2, 3, 4:
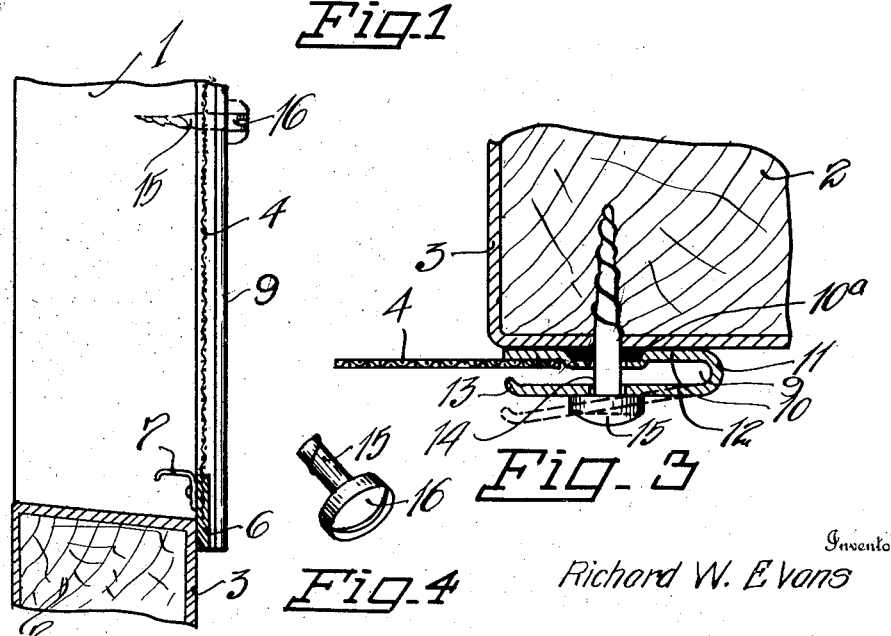
Figure 2 is an enlarged transverse sectional view showing a portion of the window frame and the screen applied thereto.
Figure 3 is an enlarged detail sectional view through one of the side rails of the screen and window frame illustrating the manner of fastening the former to the latter.
Figure 4 is a perspective view showing one of the fastening screws with its locking head.

In order that the general arrangement and assembly of parts may readily be understood I have shown in Figure 1 a portion of a closed automobile 1 and in the sectional views parts 2 of the wood structure and metal parts 3 of the window frame.

The screen, which may be made up in various shapes, but preferably rectangular as shown, is fashioned in sizes to adapt it for use with various types or sizes of window frames, and the body 4 of the screen is preferably rectangular in shape as shown in Figure 1.

The screen is provided with a top horizontal bar 5 and a bottom bar 6, preferably of metal, and the upper and lower edges of the screen body are secured to these bars in suitable manner. The screen is preferably attached at the outer side of the window frame, and at its inner side the screen is provided with a handle or lift 7, located above the window sill for convenient use in lifting the screen as indicated by dotted lines in Figure 1 to give access to the exterior of the car when required for various purposes.

The side rails 8 and 9, which together with the top and bottom bars form the rectangular frame for the screen body, are made up of folded metal strips. Each of these rails is fashioned with an inner base strip or flat plate 10 to frictionally engage and lie flat against the outer face of the window frame, a longitudinally extending bend 11, and a folded flange 12 extending the length of the rail. The rails are made up of flexible, resilient metal and the body of the screen is secured at its lateral edges within the folded rails. At its inner, free edge the flange 12 of each of the rails is fashioned with an inwardly bent lip 13, and slots 14, extending through both elements 10 and 12 of each rail are provided at the corners of the screen frame. Four fastening screws 15 are employed in connection with the slots of the frame for securing it against the outer face of the window frame, and the screws are preferably fashioned with elongated or elliptical shaped heads 16.

Between the outer face of the window frame and the inner face of the rails of the screen frame, cushion-washers 10ª may be interposed, and it will be apparent that by turning home the four screws through the slotted rails, the rails, due to the resiliency of the flanges 12 are frictionally clamped against the outer face of the window frame. In this manner the window screen is retained in position against rattling and displacement, and should the clamped joints become loosened due to vibrations from the traveling automobile, the looseness may readily be taken up by turning the screws. While the screws hold the screen with sufficient frictional engagement to prevent rattling and displacement, this friction may be overcome with reasonable exertion when it is desired to lift the screen to provide the opening at the window sill.

The screens may quickly be detached if necessary by turning the elongated heads of the screws into alinement with the slots 14 of the rails to permit withdrawal of the slotted rails over the screw heads.

When thus applied to the exterior of the window frame, the screens are effective in breaking up drafts when the windows are open and at the same time provide for proper ventilation of the interior of the vehicle.

Having thus fully described my invention, what I claim as new and desire to secure by Letters Patent is—

1. The combination with a window frame of a vertically adjustable rectangular screen having vertical elongated slots near its corners, said frame including a pair of side rails of resilient metal, each rail fashioned with a base plate and an overlapping flange, fastening screws for the slotted rails, and washers on said screws between the window frame and screen frame.

2. The combination with a window frame, of a screen supporting frame including a side rail consisting of a resiliently connected plate and flange having co-inciding slots formed therein, securing devices engaged in the slot and with the window frame and being adjustable to flex the flange towards or away from the plate to regulate the frictional engagement of the plate upon the window frame, as and for the purpose set forth.

3. The combination with a window frame, of a screen supporting frame including a side rail consisting of a resiliently connected plate and flange, the former being intimately engaged with the window frame, said plate and flange having elongated slots formed therein, an adjustable securing device engaged in the slots and secured in the window frame and being provided with an elongated head capable of passage through the slots at times, said head serving to hold the flange in flexed positions to cause the plate to frictionally engage the window frame at various tensions.

In testimony whereof I affix my signature.

RICHARD WALTER EVANS.